United States Patent [19]
Grantham

[11] 3,826,451
[45] July 30, 1974

[54] MANGETOHYDRODYNAMIC GENERATOR FOR BALLISTIC MISSILES

[75] Inventor: Rodney E. Grantham, Bethesda, Md.

[73] Assignee: The United States of America as represented by the Secretary of the Navy, Washington, D.C.

[22] Filed: Oct. 30, 1963

[21] Appl. No.: 320,225

[52] U.S. Cl............................ 244/1 SS, 102/70.2 G
[51] Int. Cl............................................... B64g 1/00
[58] Field of Search ...... 102/92.5, 49, 70.2, 70.2 H, 102/70.2 G; 244/1 SS, 14 MHD; 60/35.5 A

[56] References Cited
UNITED STATES PATENTS

| | | |
|---|---|---|
| 2,951,659 | 9/1960 | Yoler.................................. 244/14 |
| 2,998,775 | 9/1961 | Craft................................ 102/70.2 |
| 3,102,384 | 9/1963 | Bennett............................ 60/35.5 A |
| 3,123,323 | 3/1964 | Wise................................. 244/1 SS |

Primary Examiner—Samuel W. Engle
Attorney, Agent, or Firm—R. S. Sciascia; J. A. Cooke

[57] ABSTRACT

1. A power supply for re-entry vehicles, comprising:
   a magnetohydrodynamic generator having a magnet, electrodes positioned in the field thereof, and conductors extending from said electrodes to equipment in said vehicle, and
   means for supporting said generator on said vehicle in position to have atmospheric air pass through the field of said magnet as the vehicle passes through the atmosphere.

10 Claims, 3 Drawing Figures

PATENTED JUL 30 1974 3,826,451

INVENTOR.
Rodney E. Grantham
BY
ATTORNEY.
AGENT.

MANGETOHYDRODYNAMIC GENERATOR FOR BALLISTIC MISSILES

The invention described herein may be manufactured and used by or for the Government of the United States of America for governmental purposes without the payment of any royalties thereon or therefor.

The present invention relates to electric power sources for re-entry vehicles such as orbital capsules, intercontinental ballistic missiles and the like. More particularly, the invention concerns a magnetohydrodynamic power source for such vehicles.

Previously, batteries have been employed to provide power for the various elements of a re-entry vehicle, that is, for arming and fuzzing systems if the vehicle is warhead, and for terminal guidance, control systems, telemetering systems, etc. These batteries have had to be large and heavy and thus had the serious disadvantage of detracting from available payload weight and volume. Moreover, batteries have the inherent disadvantage of being unreliable unless given periodic maintenance. When batteries are employed as the power source for an arming and fuzing system in a weapon, reliability and safety of that system are questionable since energy is always present and it is possible for the weapon to be inadvertently prematurely armed.

Magnetohydrodynamic generators have been proposed as small, light and efficient power supplies for space vehicles. In such generators a hot ionized gas is passed at high velocity through a magnetic field. A voltage is induced in the gas and current is drawn off by electrodes in contact therewith. Heretofore, these devices also required a means to provide the hot ionized gas, such as a solar reflector, a nuclear fusion device or a small solid propellant rocket motor.

Accordingly, it is an object of the present invention to provide an electric power source for re-entry vehicles which does not have the disadvantages of batteries in that it is light in weight, and efficient, safe and reliable in operation.

It is a further object of the invention to provide a power source for the arming and fuzing system of a weapon which re-enters the earth's atmosphere, which power source is inherently operative only when the weapon re-enters the atmosphere, so that inadvertent premature arming is virtually impossible.

Still another object of the invention is to provide a magnetohydrodynamic generator, for re-entry vehicles, which does not require the provision of a means to produce the ionized gas, thus further reducing the weight of the power source and increasing the available payload.

These and other objects and advantages are achieved by mounting the magnetohydrodynamic generator of the present invention outside the body of the re-entry vehicle. The magnetic field is derived from a magnet encased in a block of heat protective material in the shape of a toroid. As the vehicle falls through the atmosphere the air is heated and ionized by compression in the zone in front of the toroid and passes, by virtue of the motion of the body, through the aperture or hole in the toroid where current is drawn off by electrodes. If the generator is connected to an arming system, it is clear that the system is completely safe because both the heat and velocity of re-entry are required before the generator becomes operative.

Other objects and advantages will become apparent from the following detailed description of the invention when considered in conjunction with the accompanying drawings, wherein.

Figure 1:
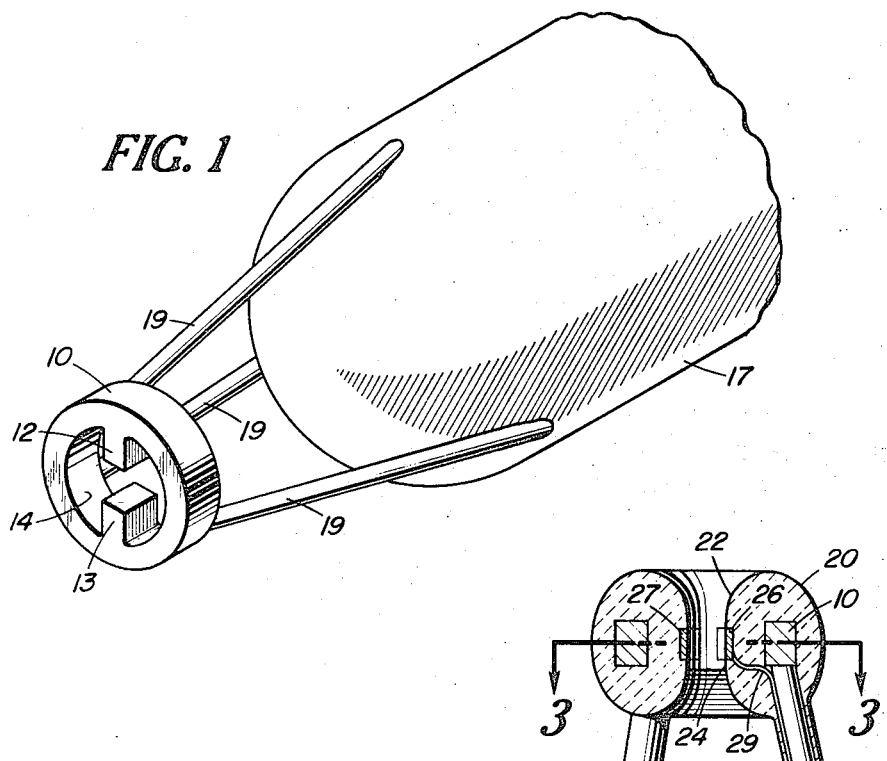
FIG. 1 is a perspective view of the forward end of a re-entry vehicle with part of the magnetohydrodynamic generator of the invention in place thereon. Parts have been omitted for clarity.

Referring to FIG. 1, the skeletal structure of the invention is shown to consist of an annular or toroidal magnet 10 having pole pieces 12 and 13 extending from the inner wall 14 toward each other along a diameter of the annulus and leaving an air gap therebetween. This magnet is supported on the forward end of a re-entry vehicle 17 by a plurality of legs 19 (here shown as three, equally spaced at 120° intervals), which may be secured in any convenient manner to the magnet and to the vehicle.

Figure 2:
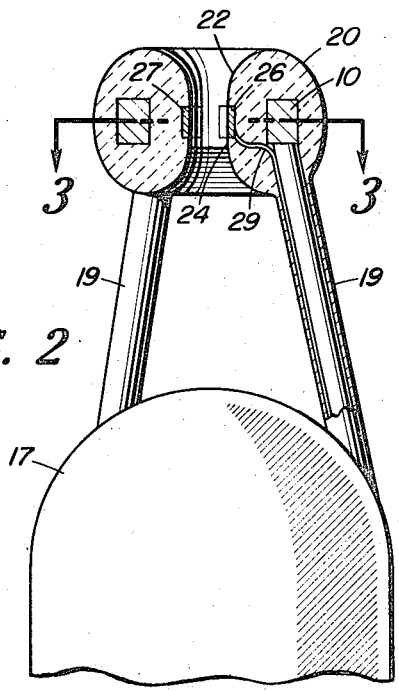
FIG. 2 is an elevational view, partly in section, of the generator of the invention.
Figure 3:
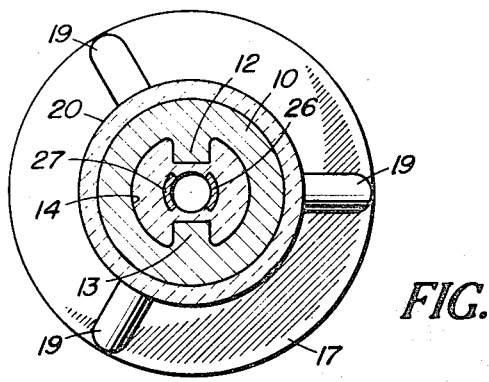
FIG. 3 is a sectional view taken on line 3—3 of FIG. 2.

Molded around the magnet is a body of refractory material 20 (FIG. 2) having an axial passageway 22 extending therethrough and arranged coaxially with the magnet between the pole pieces thereof. Consequently, a magnetic field will be established across the passageway transverse to the direction of flight of the vehicle. The refractory material is preferably molded in the shape of a toroid the generatrix of which is substantially elliptical, but, as shown in FIG. 2, a portion 24 of the wall of the passageway is cylindrical.

Set into and arranged flush with the surface of cylindrical portion 24 of the passageway are electrodes 26 and 27. An imaginary line joining the centers of the electrodes will lie at right angles to the direction of the magnetic field. Conductors, one of which is shown at 29 in FIG. 2, are connected to the electrodes to conduct current to electrical equipment within the re-entry vehicle. Legs 19 are also encased in refractory material and conductors such as 29 are embedded therein as clearly appears in FIG. 2.

In operation, as the vehicle re-enters the earth's atmosphere, the motion of the vehicle through the air will create a zone of compression immediately in front of the toroid, resulting in heating and ionization of the air, and a part of this hot ionized air will flow through the passageway in the toroid. After passing through the toroid, the air will exhaust freely through the spaces between the supporting legs and around the outside of the vehicle itself. Electrons and ions present in the flowing gas stream will be deflected to the electrodes by the magnetic field, thus establishing a current which can be used for equipment within the vehicle.

As will be clear from the foregoing, the generator of the invention becomes operative to provide current only at the time of re-entry and thereafter when both heat and high velocity are present. This characteristic makes the generator highly useful as the source for the arming system of a warhead. Up until the time of re-entry, no electrical energy will be present in the arming circuit, so that inadvertent premature arming is virtually impossible.

In addition to the ends and advantages already pointed out, the generator of the present invention has the collateral advantage of providing heat protection for the vehicle itself. Also, in the case where the vehicle is a warhead, the structure of the invention provides a convenient support for a contact type of surface burst fuse, for example.

Obviously, many modifications and variations of the present invention are possible in the light of the above teachings. It is therefore to be understood that within the scope of the appended claims the invention may be practiced otherwise than as specifically described.

What is claimed is:

1. A power supply for re-entry vehicles, comprising:

a magnetohydrodynamic generator having a magnet, electrodes positioned in the field thereof, and conductors extending from said electrodes to equipment in said vehicle, and
   means for supporting said generator on said vehicle in position to have atmospheric air pass through the field of said magnet as the vehicle passes through the atmosphere.

2. A power supply for re-entry vehicles as recited in claim 1,
   said magnet being annular in form and having pole pieces extending opposite each other along a diameter thereof,
   said electrodes being positioned at opposite sides of said diameter.

3. A device as recited in claim 2, said magnet being embedded in a body of refractory material.

4. A device as recited in claim 3, said body of refractory material being toroidal in shape, and being coaxial with said magnet.

5. A power supply for a re-entry vehicle, comprising:

means supported on the exterior of said vehicle, said means defining a passageway for atmospheric air, a magnet for establishing a magnetic field across said passageway,
   electrodes positioned at opposite sides of said passageway for receiving electrons and ions deflected by said magnetic field, and
   conductors extending from said electrodes adapted to be connected to equipment within said vehicle, whereby, when said vehicle enters the earth's atmosphere, air is heated and ionized by compression due to the motion of said vehicle and passes through said passageway, said magnet and said electrodes serving to convert the energy contained in said flowing air directly into electrical energy.

6. A device as recited in claim 5, wherein:
   said means defining a passageway is a body of refractory material in the shape of a toroid.

7. A power supply for a re-entry vehicle, comprising:

a body of refractory material having a passageway therethrough,
   means for supporting said body on said vehicle,
   a magnet embedded in said body for establishing a magnetic field across said passageway,
   electrodes in said passageway for receiving electrons and ions deflected by said magnetic field, and
   conductors leading from said electrodes adapted to be connected to equipment in said vehicle,
   whereby power for said equipment is generated when said vehicle enters the earth's atmosphere by the flow through said passageway of hot, ionized air.

8. A device as in claim 7, wherein:
   said body is in the form of a toroid, said passageway being defined by the hole through the center thereof.

9. A device as in claim 7, wherein said means for supporting said body comprises a plurality of support legs extending between said body and said vehicle, said support legs being arranged to allow free exhaust of said hot ionized air.

10. A magnetohydrodynamic power supply for a re-entry vehicle, comprising:

an annular magnet having a pair of pole pieces each extending from the inner wall of said magnet partially across a diameter thereof so as to define an air gap and a magnetic field therebetween,
    a plurality of legs connected to said magnet and adapted to support said magnet forward of the front end of said vehicle,
    heat protective material in the shape of a toroid surrounding said magnet, with the hole therethrough being arranged to pass through said air gap, said legs also being encased in heat protective material, electrodes embedded in said toroidal heat protective material, each electrode having one face thereof flush with the surface of the aforesaid hole, an imaginary line joining the centers of said electrodes lying at right angles to the direction of said magnetic field,
    and conductors extending from said electrodes and adapted to be connected to equipment in said vehicle, said conductors being entirely embedded in the toroidal heat protective material and in the heat protective material surrounding at least one of said legs,
    whereby, when said vehicle enters the earth's atmosphere, air is heated and ionized by compression due to the motion of said vehicle and passes through said hole, said magnet and said electrodes serving to convert the energy of said flowing hot, ionized air directly into electrical energy.

* * * * *